United States Patent
Taber et al.

(10) Patent No.: US 10,982,865 B2
(45) Date of Patent: Apr. 20, 2021

(54) CONDENSATION CONTROL SYSTEM AND RELATED METHOD

(71) Applicant: Delta T, LLC, Lexington, KY (US)

(72) Inventors: Christian R. Taber, Lexington, KY (US); Mark Toy, Lexington, KY (US); Jay Fizer, Lexington, KY (US); Ed Quinn, Lexington, KY (US)

(73) Assignee: DELTA T, LLC, Lexington, KY (US)

(*) Notice: Subject to any disclaimer, the term of this patent is extended or adjusted under 35 U.S.C. 154(b) by 176 days.

(21) Appl. No.: 16/113,588

(22) Filed: Aug. 27, 2018

(65) Prior Publication Data

US 2019/0078805 A1    Mar. 14, 2019

Related U.S. Application Data

(63) Continuation of application No. 14/215,538, filed on Mar. 17, 2014, now Pat. No. 10,309,663.
(Continued)

(51) Int. Cl.
*F24F 7/007* (2006.01)
*F24F 3/14* (2006.01)
(Continued)

(52) U.S. Cl.
CPC ............ *F24F 3/14* (2013.01); *F24F 7/007* (2013.01); *F24F 11/76* (2018.01); *F24F 11/77* (2018.01); *F24F 13/10* (2013.01); *F24F 13/22* (2013.01); *F24F 2003/144* (2013.01); *F24F 2013/221* (2013.01); *F24F 2110/10* (2018.01); *F24F 2110/20* (2018.01); *F24F 2110/22* (2018.01); *F24F 2221/14* (2013.01); *F24F 2221/34* (2013.01)

(58) Field of Classification Search
CPC .......... F24F 7/06; F24F 7/065; F24F 11/0001; F24F 11/0009; F24F 11/0015; F24F 11/0012; F24F 2011/0013
USPC ........................................ 454/229, 236, 256
See application file for complete search history.

(56) References Cited

U.S. PATENT DOCUMENTS 6,161,763 A    12/2000   Reuter
6,186,407 B1   2/2001    Hammer et al.
(Continued)

FOREIGN PATENT DOCUMENTS

JP        62169953 A    *   7/1987

OTHER PUBLICATIONS

Office Action dated Dec. 30, 2020; U.S. Appl. No. 16/397,235; Christian Taber.

*Primary Examiner* — Vivek K Shirsat
*Assistant Examiner* — Ko-Wei Lin
(74) *Attorney, Agent, or Firm* — King & Schickli, PLLC

(57) ABSTRACT

A system and related method are disclosed for controlling condensation in a space. The system includes a fan and one or more sensors for sensing environmental conditions such as temperature and relative humidity associated with the space and/or objects within the space. For instance, the sensors may sense a surface temperature of an object within the room. The system also includes a controller capable of receiving measurements from the sensor(s) and controlling the fan based on the sensed information. The system may additionally include a heater and/or a damper for transferring outside air into the space, either of which may be controlled by the controller based on the measurements.

15 Claims, 2 Drawing Sheets

Related U.S. Application Data

(60) Provisional application No. 61/786,878, filed on Mar. 15, 2013.

(51) Int. Cl.
| | | |
|---|---|---|
| *F24F 13/22* | (2006.01) | |
| *F24F 11/77* | (2018.01) | |
| *F24F 11/76* | (2018.01) | |
| *F24F 13/10* | (2006.01) | |
| *F24F 110/22* | (2018.01) | |
| *F24F 110/10* | (2018.01) | |
| *F24F 110/20* | (2018.01) | |

(56) References Cited

U.S. PATENT DOCUMENTS

| | | |
|---|---|---|
| 2004/0050076 A1 | 3/2004 | Palfy et al. |
| 2005/0095978 A1* | 5/2005 | Blunn .................. F24F 11/0001 454/229 |
| 2006/0063120 A1 | 3/2006 | Barlian et al. |
| 2008/0102744 A1* | 5/2008 | Moore .................. B01D 53/30 454/239 |
| 2009/0039170 A1 | 2/2009 | Burns et al. |
| 2010/0291858 A1* | 11/2010 | Toy .......................... F24F 11/77 454/258 |
| 2015/0189840 A1 | 7/2015 | Tanizawa et al. |
| 2016/0054017 A1 | 2/2016 | Takahashi |

* cited by examiner

CONDENSATION CONTROL SYSTEM AND RELATED METHOD

The disclosures of U.S. Utility application Ser. No. 14/215,538 filed Mar. 17, 2014 and U.S. Provisional Patent Application No. 61/786,878 filed Mar. 15, 2013 are incorporated herein by reference.

TECHNICAL FIELD

This disclosure relates generally to a circulation device such as a fan and more particularly to a fan for controlling condensation.

BACKGROUND OF THE INVENTION

A variety of fan systems have been made and used over the years in a variety of contexts. For instance, various ceiling fans are disclosed in U.S. Pat. No. 7,284,960, entitled "Fan Blades," issued Oct. 23, 2007; U.S. Pat. No. 6,244,821, entitled "Low Speed Cooling Fan," issued Jun. 12, 2001; U.S. Pat. No. 6,939,108, entitled "Cooling Fan with Reinforced Blade," issued Sep. 6, 2005; and U.S. Pat. No. D607,988, entitled "Ceiling Fan," issued Jan. 12, 2010. The disclosures of each of those U.S. patents are incorporated by reference herein. Additional exemplary fans are disclosed in U.S. Pat. Pub. No. 2008/0008596, entitled "Fan Blades," published Jan. 10, 2008; U.S. Pat. Pub. No. 2009/0208333, entitled "Ceiling Fan System with Brushless Motor," published Aug. 20, 2009; and U.S. Pat. Pub. No. 2010/0278637, entitled "Ceiling Fan with Variable Blade Pitch and Variable Speed Control," published Nov. 4, 2010, the disclosures of which are also incorporated by reference herein. It should be understood that teachings herein may be incorporated into any of the fans described in any of the above-referenced patents, publications, or patent applications. It should also be understood that a fan may include sensors or other features that are used to control, at least in part, operation of a fan system. For instance, such fan systems are disclosed in U.S. Pat. Pub. No. 2009/0097975, entitled "Ceiling Fan with Concentric Stationary Tube and Power-Down Features," published Apr. 16, 2009, the disclosure of which is incorporated by reference herein; U.S. Pat. Pub. No. 2009/0162197, entitled "Automatic Control System and Method to Minimize Oscillation in Ceiling Fans," published Jun. 25, 2009, the disclosure of which is incorporated by reference herein; U.S. Pat. Pub. No. 2010/0291858, entitled "Automatic Control System for Ceiling Fan Based on Temperature Differentials," published Nov. 18, 2010, the disclosure of which is incorporated by reference herein; and U.S. Provisional Patent App. No. 61/165,582, entitled "Fan with Impact Avoidance System Using Infrared," filed Apr. 1, 2009, the disclosure of which is incorporated by reference herein. Alternatively, any other suitable control systems/features may be used in conjunction with embodiments described herein.

Condensation will form on any object when the temperature of the object is at or below the dew point temperature of the air surrounding the object. This condensation can lead to many problems, such as dampness, surface degradation, mold growth, wood rot, corrosion or rust, or the like, any of which may require costly remediation. The occurrence of condensation is especially prevalent in areas that are not subject to being conditioned using typical HVAC systems, such as large industrial spaces, warehouses, or the like, as well as in areas with considerable amounts of ambient moisture (e.g., food processing, natatoriums, etc.) or that require high relative humidity (e.g., wine aging).

Accordingly, a need is identified for a manner of controlling the circulation of air in a space to help prevent the formation of condensation on one or more surfaces in the space. The system may evaluate the surface temperature of an object in the space and, based on the temperature of the surrounding air (which may be the dry bulb temperature, the dew point temperature, or trends for either), control the operation of a circulation device, such as a fan. Optional heating of the air could also be provided, as could the introduction of outdoor air in an effort to prevent condensation from forming.

SUMMARY OF THE INVENTION

According to one aspect of the disclosure, a system for controlling the circulation of air in an indoor area of a structure is provided. The system comprises a fan for circulating the air within the indoor area, a first sensor for sensing a temperature of a surface in the indoor area, and a controller for controlling operation of the fan when at least one of the following conditions is met: (a) a temperature of the air is greater than the surface temperature and the temperature of the air is trending upward; (b) the air temperature is warmer than the surface temperature; or (c) the surface temperature is equal to or less than a dew point temperature of the air, and (i) the dew point temperature is trending upward; or (ii) the surface temperature is trending downward.

In one embodiment, the fan is adapted for mounting on or adjacent a ceiling of the indoor area, and includes a plurality of exposed blades for directing air onto the surface. The controller may control the speed and/or time of operation of the fan. A second sensor may be provided for sensing the relative humidity of the air in the area and a third sensor for sensing the temperature of the air in the indoor area, and wherein the controller is adapted for determining the dew point temperature based on the relative humidity and the air temperature.

The system may further include a heater for heating the air in the space, the heater being controlled by the controller. The heater may be turned on when either the surface temperature is less than or equal to the dew point temperature of the indoor air and the dew point temperature of the indoor air is trending upwardly, or the surface temperature is less than or equal to the dew point temperature of the indoor air. The heater may be selected from the group consisting of a radiant heater, a forced air heater, or a combination thereof.

The system may further include a damper for admitting outdoor air into the space when the outdoor humidity ratio is less than or equal to the indoor humidity ratio. Opening and closing of the damper may be controlled by the controller. The system may also include a second sensor for sensing one or more of an outdoor air temperature and an outdoor humidity and communicating the sensed outdoor air temperature and humidity to the controller.

The controller may operate to turn the fan on when the air temperature is warmer than the surface temperature. The controller may alternatively turns the fan on when the air temperature is warmer than the surface temperature and the air temperature is trending upward. The controller may turn the fan on when the surface temperature is equal to or less than a dew point temperature of the air, and: (i) the dew point temperature is trending upward; or (ii) the surface temperature is trending downward.

This disclosure also pertains to a method of preventing the formation of condensation on a surface in an indoor area. The method comprises sensing a temperature of the surface, and using a fan, circulating air in the indoor area based on the sensed surface temperature when at least one of the following conditions is met: (a) the air temperature is greater than the surface temperature and a temperature of the air is trending upward, the fan turns on; (b) the air temperature is greater than the surface temperature; or (c) the surface temperature is equal to or less than a dew point temperature of the air, and (i) the dew point temperature is trending upward; or (ii) the surface temperature is trending downward.

The method may comprise the step of circulating the air comprises activating a ceiling fan in the indoor area. The step of circulating the air may comprise opening a damper to admit outdoor air to the indoor area. The step of circulating air may occur once the air temperature is warmer than the surface temperature and the air temperature is trending upward, or simply once the air temperature is greater than the surface temperature. The circulating step may occur once the surface temperature is equal to or less than a dew point temperature of the air, and (i) the dew point temperature is trending up; or (ii) the surface temperature is trending downward.

A further aspect of this disclosure pertains to a system for controlling the circulation of air in an indoor area of a structure having walls, a floor, and a ceiling. The system comprises a fan for directing air toward an object above the floor in the indoor area, and a first sensor for sensing a temperature of a surface of the object. The system further includes a controller for controlling the fan when at least one of the following conditions is met: (a) a temperature of the air is greater than the surface temperature and the temperature of the air is trending upward; (b) the air temperature is warmer than the surface temperature; or (c) the surface temperature is equal to or less than a dew point temperature of the air, and (i) the dew point temperature is trending upward; or (ii) the surface temperature is trending downward.

DETAILED DESCRIPTION OF THE INVENTION

The following description of certain examples of the invention should not be used to limit the scope of the present invention. Other examples, features, aspects, embodiments, and advantages of the invention will become apparent to those skilled in the art from the following description, which includes by way of illustration, one or more of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
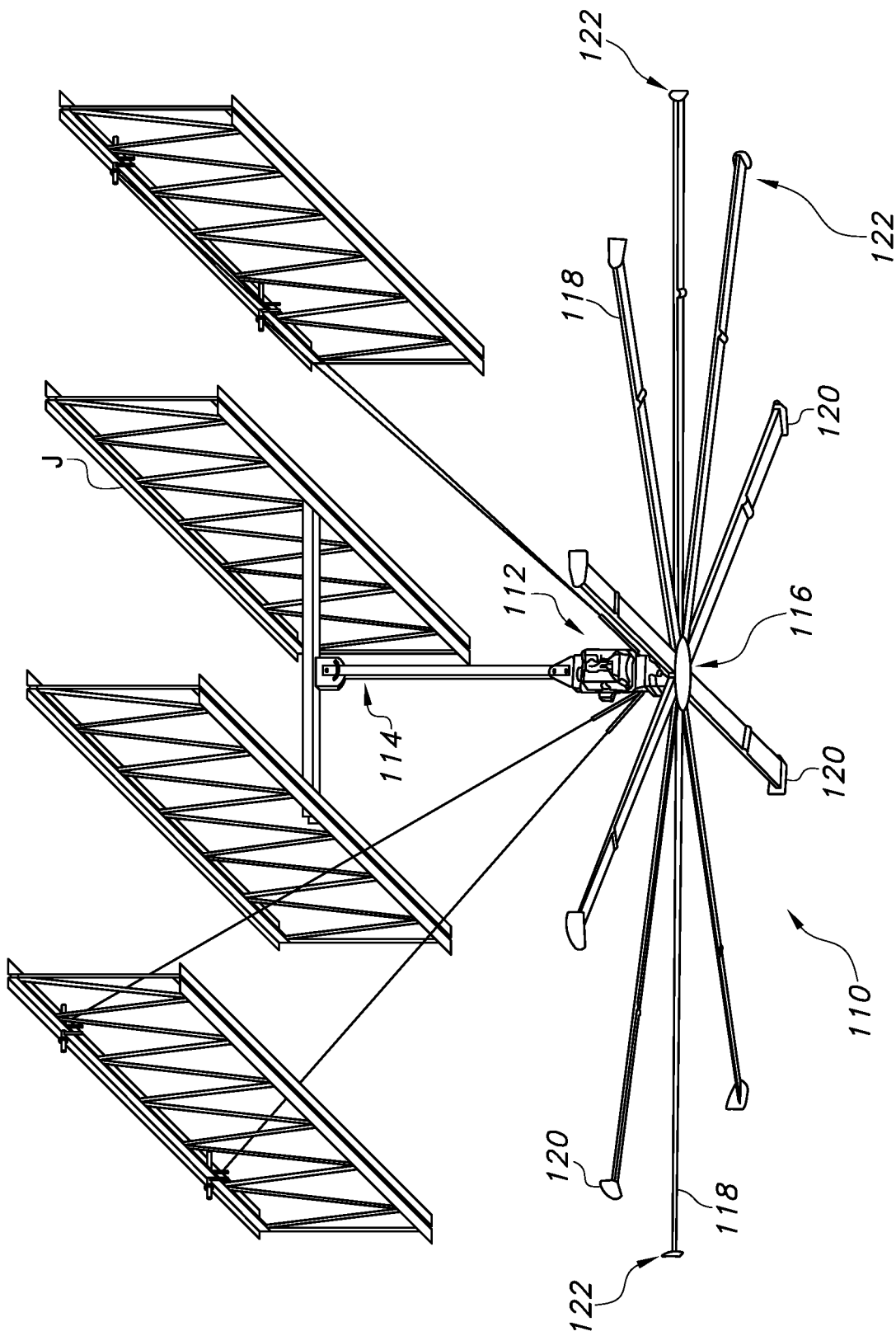
FIG. 1 is a perspective view of a fan utilized in the system of the present invention.

Referring to FIG. 1, a fan (110) of the present example comprises a motor assembly (112), a support (114), a hub assembly (116), and a plurality of fan blades (118). In the present example, fan (110) (including hub assembly (116) and fan blades (118)) has a diameter of approximately 8 feet.

In other variations, fan (110) has a diameter between approximately 2 feet, inclusive, and approximately 24 feet, inclusive. Alternatively, fan (110) may have any other suitable dimensions.

Support (114) is configured to be coupled to a surface or other stable support structure (such as a joist, beam, or the like) at a first end such that fan (110) is substantially attached to the surface or other structure. As shown in FIG. 1, one such example of a structure may be a ceiling joist (J). Support (114) of the present example comprises an elongate metal tube-like structure that couples fan (110) to a ceiling, though it should be understood that support (114) may be constructed and/or configured in a variety of other suitable ways as will be apparent to one of ordinary skill in the art in view of the teachings herein. By way of example only, support (114) need not be coupled to a ceiling or other overhead structure, and instead may be coupled to a wall or to the ground. For instance, support (114) may be positioned on the top of a post that extends upwardly from the ground. Alternatively, support (114) may be mounted in any other suitable fashion at any other suitable location. This includes, but is not limited to, the teachings of the patents, patent publications, or patent applications cited herein. By way of example only, support (114) may be configured in accordance with the teachings of U.S. Pat. Pub. No. 2009/0072108, entitled "Ceiling Fan with Angled Mounting," published Mar. 19, 2009, the disclosure of which is incorporated by reference herein. As yet another alternative, support (114) may have any other suitable configuration. Furthermore, support (116) may be supplemented in numerous ways. One merely illustrative example is described in detail below, while other examples and variations will be apparent to those of ordinary skill in the art in view of the teachings herein.

Motor assembly (112) of the present example comprises an AC induction motor having a drive shaft, though it should be understood that motor assembly (112) may alternatively comprise any other suitable type of motor (e.g., a permanent magnet brushless DC motor, a brushed motor, an inside-out motor, etc.). In the present example, motor assembly (112) is fixedly coupled to support (114) and rotatably coupled to hub assembly (100). Furthermore, motor assembly (112) is operable to rotate hub assembly (116) and the plurality of fan blades (118). By way of example only, motor assembly (112) may be constructed in accordance with at least some of the teachings of U.S. Pat. Pub. No. 2009/0208333, entitled "Ceiling Fan System with Brushless Motor," published Aug. 20, 2009, the disclosure of which is incorporated by reference herein. Furthermore, fan (110) may include control electronics that are configured in accordance with at least some of the teachings of U.S. Pat. Pub. No. 2010/0278637, entitled "Ceiling Fan with Variable Blade Pitch and Variable Speed Control," published Nov. 4, 2010, the disclosure of which is incorporated by reference herein. Alternatively, motor assembly (112) may have any other suitable components, configurations, functionalities, and operability, as will be apparent to those of ordinary skill in the art in view of the teachings herein.

Hub assembly (116) may be constructed in accordance with at least some of the teachings of U.S. Pat. Pub. No. 2010/0278637, entitled "Ceiling Fan with Variable Blade Pitch and Variable Speed Control," published Nov. 4, 2010, the disclosure of which is incorporated by reference herein. Alternatively, hub assembly (116) may be constructed in accordance with any of the teachings or other patent references cited herein. Still other suitable ways in which hub assembly (116) may be constructed will be apparent to those of ordinary skill in the art in view of the teachings herein. It should also be understood that an interface component (not shown) may be provided at the interface of each fan blade (118) and hub assembly (116). By way of example only, such an interface component may be configured in accordance with the teachings of U.S. Pat. Pub. No. 2009/0081045, entitled "Aerodynamic Interface Component for Fan Blade," published Mar. 26, 2009, the disclosure of which is incorporated by reference herein. Of course, such an interface component may be omitted if desired.

Fan blades (118) may further be constructed in accordance with some or all of the teachings of any of the patents, patent publications, or patent applications cited herein. For example, fan blades (118) may be configured in accordance with the teachings of U.S. Pat. No. 7,284,960, entitled "Fan Blades," issued Oct. 23, 2007; U.S. Pat. No. 6,244,821, entitled "Low Speed Cooling Fan," issued Jun. 12, 2001; and/or U.S. Pat. No. 6,939,108, entitled "Cooling Fan with Reinforced Blade," issued Sep. 6, 2005. The disclosures of each of those U.S. patents are incorporated by reference herein. As another merely illustrative example, fan blades (118) may be configured in accordance with the teachings of U.S. Pat. Pub. No. 2008/0008596, entitled "Fan Blades," published Jan. 10, 2008, the disclosure of which is also incorporated by reference herein. As yet another merely illustrative example, fan blades (118) may be configured in accordance with the teachings of U.S. Pat. Pub. No. 2010/0104461, entitled "Multi-Part Modular Airfoil Section and Method of Attachment Between Parts," published Apr. 29, 2010, the disclosure of which is incorporated by reference herein. Alternatively, any other suitable configurations for fan blades (118) may be used in conjunction with the examples described herein.

In the present example, fan blades (118) are formed of aluminum through an extrusion process such that each fan blade has a substantially uniform cross section along its length. It should be understood that fan blades (118) may alternatively be formed using any suitable material, or combination of materials, by using any suitable technique, or combination of techniques, and may have any suitable cross-sectional properties or other properties as will be apparent to one of ordinary skill in the art in view of the teachings herein.

Fan blades (118) of the present example may further include a variety of modifications. By way of example only, fan blade (118) of the present example further comprises a winglet (120) coupled to the second end (122) of fan blade (118). Winglets (120) may be constructed in accordance with some or all of the teachings of any of the patents, patent publications, or patent applications cited herein. For instance, winglets (120) may be configured in accordance with at least some of the teachings of U.S. Pat. No. 7,252,478, entitled "Fan Blade Modifications," issued Aug. 7, 2007, the disclosure of which is incorporated by reference herein. As another merely illustrative example, winglets (120) may be configured in accordance with the teachings of U.S. Pat. Pub. No. 2008/0014090, entitled "Cuffed Fan Blade Modifications," published Jan. 17, 2008, the disclosure of which is incorporated by reference herein. As yet another merely illustrative example, winglets (120) may be configured in accordance with the teachings of U.S. Pat. No. D587,799, entitled "Winglet for a Fan Blade," issued Mar. 3, 2009, the disclosure of which is incorporated by reference herein. Of course, any other suitable configuration for winglets (120) may be used as will be apparent to those of ordinary skill in the art in light of the teachings herein.

It should also be understood that winglet (120) is merely optional. For instance, other alternative modifications for fan blades (118) may include end caps, angled airfoil extensions, integrally formed closed ends, or substantially open ends. By way of example only, an angled extension may be added to the free end of each fan blade (118) in accordance with the teachings of U.S. Pat. Pub. No. 2008/0213097, entitled "Angled Airfoil Extension for Fan Blade," published Sep. 4, 2008, the disclosure of which is incorporated by reference herein. Other suitable structures that may be associated with second end (122) of each fan blade (118) will be apparent to those of ordinary skill in the art in view of the teachings herein.

Figure 2:
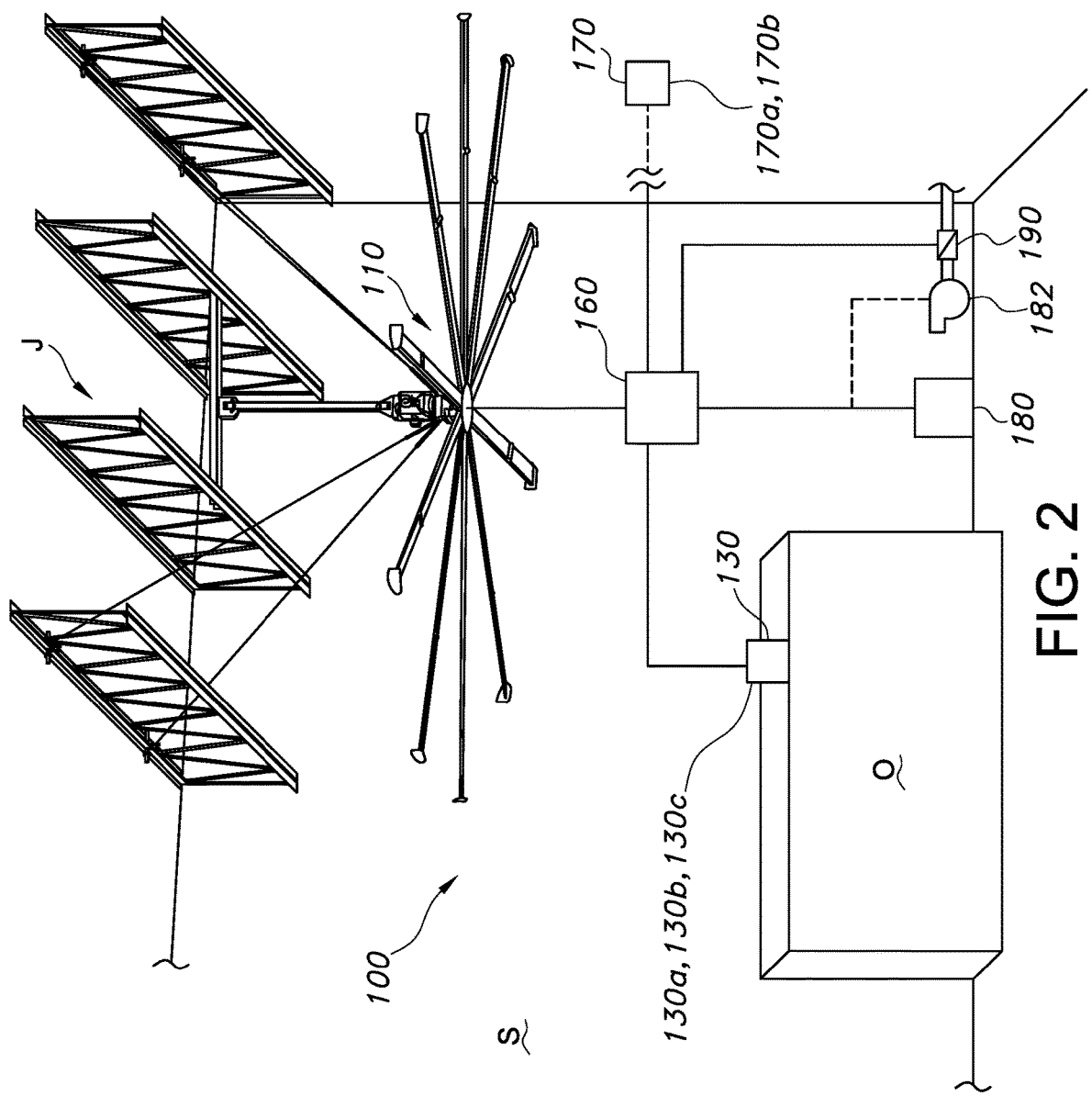
FIG. 2 is a schematic of the condensation control system of the present invention including the fan of FIG. 1.

Turning now to FIG. 2, it may be desirable to utilize exemplary fan (110) disclosed above in connection with a control system (100) that regulates the operation of the fan based at least on the detection of one or more parameters, including but not limited to surface temperature. By way of example only, the arrangement may further include at least one exemplary fan (110), at least one sensor (130) and a controller (160) for communicating with the sensor (130). In a first embodiment, the sensor (130) comprises a first sensor (130*a*) for sensing the temperature of a surface within a space (S), such as an indoor space (e.g., a room or like enclosed or substantially enclosed area), in which the fan (110) is located. For instance, the surface may be the surface of an object (O) positioned within the space, the temperature of which is subject to being controlled by the fan (110). For example, the object (O) may comprise a piece of material (such as steel, concrete, etc.) or a fixture within the room (such as a machine, racking, ductwork, or the like). The particular shape, form, or material for the object (O) is not considered critical, and may include any object having a surface susceptible to the formation of condensation.

The sensor (130) may also comprise a second sensor (130*b*) for sensing the air temperature and, in particular, the air dry-bulb temperature (ADBT), which is the temperature of the air measured by a thermometer freely exposed to the air but shielded from radiation and moisture. In addition, the sensor (130) may include a relatively humidity sensor (130*c*). The individual sensors (130*a*, 130*b*, 130*c*) may form part of the same structure, or may be provided independent of each other. In one aspect, the sensors (130*a*, 130*b*, 130*c*) may be in relatively close proximity to each other so that the measurements are homogenous. In another aspect, one or more sensors (130*a*, 130*b*, 130*c*) may be located at a remote location. For example, the first sensor (130*a*) for sensing the temperature of the surface may be remote from the surface, such as attached to or adjacent the fan, the controller, or any other part of the system or room. The sensor may be in the form of an infrared sensor The controller (160) may be adapted for using input from one or more of the sensors (130*a*, 130*b*, 130*c*) in order to determine the dew point temperature of the air in the indoor space (S). This may be done using the following formula:

$$T_d = T\left[1 - \frac{T\ln\left(\frac{RH}{100}\right)}{L/R_w}\right]^{-1}. \tag{1}$$

Where:

$T_d$ is the dew point temperature,

RH is the relative humidity,

T is the temperature in Kelvin (T=$t_{air}$+273.15),

Rw is the gas constant for water vapor (461.5 J/K kg), and

L is the enthalpy of vaporization (which varies between L=2.501×10^6 J/kg at T=273.15 K and L=2.257×10^6 J/kg at T=373.15 K, but one exemplary value found useful is 2.472×10^6 J/kg).

However, any other manner of assessing the dew point temperature may be used, and the disclosure is thus not limited to this particular approach.

The controller (160) may also make determinations regarding the indoor air dew point temperature (ADPT1), the indoor air dry bulb temperature (ADB1), and the surface temperature (STS1), as measured by the sensors 130a, 130b, 130c) over time. Using this data, the controller (160) may determine a trend using any known statistical technique, including for example linear interpolation and determining whether the derivative is positive or negative. Based on one or more of these trends, the controller (160) may control the operation of the fan (110) in an effort to prevent condensation from forming on the object (O). For example, the controller (160) may turn the fan on for a predetermined time when:

$$ADB1 \geq STS1+K1 \text{ and ADB1 is trending upward;} \quad (1)$$

$$ADB1 \geq STS1+K2; \text{ or} \quad (2)$$

$$STS1 \leq ADPT1+K3 \text{ and ADPT1 trending upward or } STS1 \text{ trending downward.} \quad (3)$$

K1, K2, and K3 are constants that may be determined based on observations or empirical data. In one example, K1=3 degrees F., K2=7 degrees F., and K3=2 degrees F., but these may of course vary. The temperature comparisons are also made using temperatures of the same units of measure.

The controller (160) may also determine the run time of the fan (110) following one or more of the conditions being met. The timing may be predetermined, and may proceed for a minimum amount of time (e.g., 15 minutes) or a prolonged time (e.g., 6 hours) to ensure that condensation is controlled (either by avoidance or by increasing the evaporation rate of the moisture from the surface in the event that condensation has occurred). The fan (110) may be automatically turned off following the predetermined time, and may remain off until a triggering event occurs.

In accordance with a second aspect of this disclosure, the control system (100) may also be adapted to provide a further measure of control through heating of the indoor air. This heating may be provided by one or more heaters (180), which may comprise a radiant heater, forced air fan or the like. The heater (180) may also communicate with and be regulated by the controller (160) to assist in preventing condensation from forming on a surface of the object (O) or objects.

In one embodiment, the controller (160) may be associated with an outdoor sensor (170) for sensing one or more conditions of the outdoor air. For instance, the outdoor sensor (170) may include a first sensor (170a) for sensing the outdoor temperature and, in particular, the dry bulb temperature of the outdoor air. A second sensor (170b) may also be provided for sensing the relative humidity of the outdoor air. Again, the sensors (170a, 170b) may be combined together in a single unit, may be in close proximity to each other, or may be separated.

Using the output from the outdoor sensor (170), the controller (160) may further make determinations regarding the outdoor air dew point temperature (ADPTO), the outdoor air dry bulb temperature (ADB2), and the relative humidity (ARHO), as measured by the sensors (170a, 170b) over time. Using this data, the controller (160) may determine a trend using any known statistical technique, including for example linear interpolation. Based on one or more of these trends, the controller (160) may control the operation of the heater (110) in an effort to prevent condensation from forming on the object (O). For example, the controller (160) may turn the heater (110) on for a predetermined time when:

$$STS1 \leq ADPT1+K4 \text{ and ADPT1 is trending upward;} \quad (1)$$

$$STS1 \leq ADPT1+K5 \quad (2)$$

K4 and K5 are constants that may be determined based on observations or empirical data. In one example, K4=10 degrees F. and K5=5 degrees F., but these may of course vary.

The controller (160) may also determine the run time of the heater (180) following one or more of the conditions being met. The timing may be predetermined, and may proceed for a minimum amount of time (e.g., 6 hours). The heater (180) may be automatically turned off following the predetermined time, and may remain off until a triggering event. The heater (180) may also be turned off when it is determined that the surface temperature (e.g., STS1) is greater than the dew point temperature of the indoor air (ADPT1) by a predetermined amount (e.g. 12 degrees F.), or if the indoor air dew point temperature is trending downwardly for a period of time following the initiating of heating.

The controller (160) may also be adapted to calculate indoor and outdoor humidity ratios, such as using ADB1, ARH1 and ADB2, ARH2. Based on the determinations made, the decision can be made to admit outdoor air to the space (S), such as via a blower (182) associated with the heater (180) an effort to control the humidity and thus foreclose condensation. For example, the space (S) may be equipped with a damper (190) controlled by controller (160) to open and close. This damper (190) is shown as being external to the heater (180), but may form part of it as well. When the outdoor relative humidity ratio, AHRO, is less than or equal to the indoor humidity ratio, ARH1, the damper (190) may be opened. When the indoor humidity ratio, ARH1, is greater than the outdoor humidity ratio, ARHO, the damper (190) may be closed.

It is also possible to monitor the outdoor air dew point temperature to determine when it may be advantageous to admit outdoor air without using the heater. For example, higher dry bulb temperature (ADB2) and lower dew point temperature (ADPTO) for outdoor air could trigger the system (100) to admit outdoor air via damper (190), which would result in less energy being consumed by the heater (180). The system (100) could also switch over to admitting outdoor air if the dew point temperature (ADPTO) of the outdoor air is lower than the indoor dew point temperature (ADPT1), even if the outdoor air dry bulb temperature (ADB2) is lower.

While exemplary control system (100) is shown as including fan (110) as described above, it should be understood that any other type of fan may be included in exemplary thermal comfort control system (100), including combinations of different types of fans. Such other fans may include pedestal mounted fans, wall mounted fans, or building ventilation fans, among others. It should also be understood that the locations of sensor (130) as shown in FIG. 2 is merely exemplary. Sensor (130) may be positioned at any other suitable locations, in addition to or in lieu of the locations shown in FIG. 2. By way of example, the sensor (130) may be mounted on or adjacent to a joist, to the fan (110), to a wall, and/or in any other suitable location(s). Various suitable locations where the sensors (130, 170) may be located will be apparent to those of ordinary skill in the art in view of the teachings herein. Multiple sensors (130) may also be provided, and the controller (160) may be used to control multiple fans. Furthermore, it should be understood that sensor(s) themselves are mere examples. Furthermore, various other kinds of sensors may be used as desired, in addition to or in lieu of one or more of sensors (130, 170). Furthermore, system (100) may receive information from one or more other sources, including but not limited to online sources. For instance, system (100) may receive one or more temperature values, other values, algorithms, firmware updates, software updates, and/or other kinds of information through wire or wirelessly. Various suitable ways in which system (100) may communicate with the internet and/or other networks, as well as various types of information that may be communicated, will be apparent to those of ordinary skill in the art in view of the teachings herein. The system (100) may also be provided with data storage capabilities that allow for the exporting or viewing monitored points for a historical time period (e.g., 5 days, 30 days, etc.) depending on the frequency of data collection (e.g., 30 seconds, 60 seconds, 15 minutes, etc.).

Having shown and described various embodiments, further adaptations of the methods and systems described herein may be accomplished by appropriate modifications by one of ordinary skill in the art without departing from the scope of the disclosure. Several of such potential modifications have been mentioned, and others will be apparent to those skilled in the art. For instance, the sensor may comprise a sensor for sensing the temperature of a part of the room (e.g., ceiling, floor, wall, etc.). Additionally, the system may be used for preventing condensation on said part of the room. Furthermore, the examples, embodiments, geometries, materials, dimensions, ratios, steps, and the like discussed above are illustrative and are not required.

Accordingly, the scope of the disclosure should be considered in terms of claims that may be presented, and is understood not to be limited to the details of structure and operation shown and described in the specification and drawings.

The invention claimed is:

1. A system for controlling the circulation of air in an indoor area of a structure, comprising:
    a fan for circulating the air within the indoor area;
    a first sensor for sensing a temperature of a surface in the indoor area; and
    a controller for controlling operation of the fan to circulate air in the indoor area when at least one of the following conditions is met:
    (a) a temperature of the air is greater than the surface temperature and the temperature of the air is trending upward; or
    (b) the surface temperature is equal to or less than a dew point temperature of the air, and (i) the dew point temperature is trending upward; or (ii) the surface temperature is trending downward.

2. The system of claim 1, wherein the fan is adapted for mounting on or adjacent a ceiling of the indoor area, and includes a plurality of exposed blades for directing air onto the surface.

3. The system of claim 1, wherein the controller controls the speed and/or time of operation of the fan.

4. The system of claim 1, further including a second sensor for sensing the relative humidity of the air in the area and a third sensor for sensing the temperature of the air in the indoor area, and wherein the controller is adapted for determining the dew point temperature based on the relative humidity and the air temperature.

5. The system of claim 1, further including a heater for heating the air in the space, the heater being controlled by the controller.

6. The system of claim 5, wherein the heater is turned on when:
    the surface temperature is less than or equal to the dew point temperature of the indoor air and the dew point temperature of the indoor air is trending upwardly; or
    the surface temperature is less than or equal to the dew point temperature of the indoor air.

7. The system of claim 5, wherein the heater is selected from the group consisting of a radiant heater, a forced air heater, or a combination thereof.

8. The system of claim 1, further including a damper for admitting outdoor air into the space when the outdoor humidity ratio is less than or equal to the indoor humidity ratio.

9. The system of claim 8, wherein opening and closing of the damper is controlled by the controller.

10. The system of claim 1, further including a sensor for sensing one or more of an outdoor air temperature and an outdoor humidity and communicating the sensed outdoor air temperature or humidity to the controller.

11. A method of preventing the formation of condensation on a surface in an indoor area, comprising:
    sensing a temperature of the surface; and
    using a fan, circulating air in the indoor area based on the sensed surface temperature when at least one of the following conditions is met:
    (a) the air temperature is greater than the surface temperature and a temperature of the air is trending upward, the fan turns on; or
    (b) the surface temperature is equal to or less than a dew point temperature of the air, and (i) the dew point temperature is trending upward; or (ii) the surface temperature is trending downward.

12. The method of claim 11, wherein the step of circulating the air comprises activating a ceiling fan in the indoor area.

13. The method of claim 11, wherein the step of circulating the air comprises opening a damper to admit outdoor air to the indoor area.

14. A system for controlling the circulation of air in an indoor area of a structure having walls, a floor, and a ceiling, comprising:
    a fan for directing air toward an object above the floor in the indoor area;
    a first sensor for sensing a temperature of a surface of the object; and
    a controller for controlling the fan to circulate air in the indoor area when at least one of the following conditions is met:
    (a) a temperature of the air is greater than the surface temperature and the temperature of the air is trending upward; or
    (b) the surface temperature is equal to or less than a dew point temperature of the air, and (i) the dew point temperature is trending upward; or (ii) the surface temperature is trending downward.

15. The system of claim 1, further including a second sensor for sensing the temperature of the air.

* * * * *